US011627564B2

(12) United States Patent
Guo

(10) Patent No.: US 11,627,564 B2
(45) Date of Patent: *Apr. 11, 2023

(54) METHODS AND APPARATUS FOR CONTROL CHANNEL DETECTION IN AN UPLINK SHARED CHANNEL

(71) Applicant: Marvell Asia Pte, Ltd., Singapore (SG)

(72) Inventor: Yuanbin Guo, Mountain House, CA (US)

(73) Assignee: Marvell Asia Pte Ltd., Singapore (SG)

( * ) Notice: Subject to any disclaimer, the term of this patent is extended or adjusted under 35 U.S.C. 154(b) by 40 days.

This patent is subject to a terminal disclaimer.

(21) Appl. No.: 17/228,581

(22) Filed: Apr. 12, 2021

(65) Prior Publication Data
US 2021/0235443 A1 Jul. 29, 2021

Related U.S. Application Data

(63) Continuation of application No. 16/571,164, filed on Sep. 15, 2019, now Pat. No. 10,999,826, which is a continuation of application No. 15/719,171, filed on Sep. 28, 2017, now Pat. No. 10,448,377.

(51) Int. Cl.
*H04W 72/04* (2009.01)
*H04L 5/00* (2006.01)
*H04W 72/06* (2009.01)

(52) U.S. Cl.
CPC ....... *H04W 72/0413* (2013.01); *H04L 5/0046* (2013.01); *H04L 5/0055* (2013.01); *H04L 5/0057* (2013.01); *H04W 72/06* (2013.01)

(58) Field of Classification Search
CPC .............. H04W 72/0413; H04W 72/06; H04L 5/0046; H04L 5/0055; H04L 5/0057
USPC ......................................... 370/310, 328, 329
See application file for complete search history.

(56) References Cited

U.S. PATENT DOCUMENTS

2016/0036547 A1* 2/2016 Lee ....................... H04B 7/0486
370/329
2017/0332364 A1* 11/2017 Sano .................... H04J 11/0056

* cited by examiner

*Primary Examiner* — Obaidul Huq
(74) *Attorney, Agent, or Firm* — JW Law Group; James M. Wu

(57) ABSTRACT

Methods and apparatus for channel detection in an uplink shared control channel. In an exemplary embodiment, a method includes generating soft-combined bit streams for an acknowledgement (ACK) indicator, rank indicator (RI), and channel quality indicator (CQI) received in an uplink shared channel. The method also includes decoding the ACK, RI, and CQI soft-combined bit streams to generate Top-M decoded bit streams for each indicator, and generating Top-Q symbols for each indicator from the Top-M decoded bit streams for each indicator. The method also includes calculating metrics from the Top-Q symbols and uplink control information (UCI) symbols extracted from the uplink shared channel, combining the metrics to form a search space, and searching the search space to determine transmitted ACK, RI, and CQI bits.

28 Claims, 7 Drawing Sheets

METHODS AND APPARATUS FOR CONTROL CHANNEL DETECTION IN AN UPLINK SHARED CHANNEL

PRIORITY

This patent application is a continuation patent application of a co-pending U.S. patent application with a Ser. No. 16/571,164, filed on Sep. 15, 2019 in the name of the same inventor and entitled "Methods and Apparatus for Control Channel Detection in An Uplink Shared Channel," which has been issued into a U.S. patent with a Patent No. 10,999,826, which is a continuation patent application of a co-pending U.S. patent application having a U.S. patent application Ser. No. 15/719,171, filed on Sep. 28, 2017 in the name of the same inventor and entitled "Methods and Apparatus for Control Channel Detection in An Uplink Shared Channel," which has been issued with a U.S. Pat. No. 10,448,377, all of which are hereby incorporated herein by reference in their entirety.

FIELD

The exemplary embodiments of the present invention relate to telecommunications networks. More specifically, the exemplary embodiments of the present invention relate to receiving and processing data streams via a wireless communication network.

BACKGROUND

There is a rapidly growing trend toward mobile and remote data access over high-speed communication networks, such as provided by third generation (3G) or fourth generation (4G) cellular services. For example, using these services, users now rely on their smartphones for texting, access to email, banking, and social media, and for sending and receiving pictures and video.

Typically, wireless network performance depends in part on the quality of the transmission channel. For example, if the channel conditions are good, the network may perform with higher speed and capacity than when the channel conditions are poor. To obtain the best network performance, wireless networks may rely on user devices (e.g., user equipment "UE") to report control information back to the network. The control information includes parameters indicating the channel conditions and/or transmission parameters. One mechanism available to user devices to report control information back to the network is through a physical uplink shared control channel (PUSCH). The network receives the control information over this channel and uses the received parameters to adjust data transmissions for optimum performance based on the network conditions indicated by the received parameters.

The PUSCH carries important uplink control information (UCI), including a Channel Quality Indicator (CQI), a Rank Indicator (RI), and a Hybrid Automatic Repeat Request Acknowledge (HARQ-ACK). The performance of ACK messages play an important role in the overall downlink performance as the residual error rate of HARQ is in the same order of the feedback error rate of the ACK bits. The CQI information represents the recommended modulation scheme and coding rate to be used for downlink transmissions. Its accuracy greatly impacts the overall system throughput that can be achieved in a noisy channel. Thus, improving the error performance of both CQI and ACK detection is desirable to the achieve improved network throughput.

However, there exists a tradeoff between allocating resources for the control information and the resources reserved for data transmission. Typically, the more resources allocated to the control information, the better control information decoding performance. On the other hand, the resources allocated to the information are competing with the available resource and achievable throughput for the uplink data. It is desirable to increase the decoding performance of the control bits without sacrificing the resource that can be allocated to the data portion. Yet, more advanced decoding should introduce minimum complexity and latency.

Therefore, it is desirable to have a detection mechanism that efficiently detects with high probability, control bit information transmitted from user equipment over a PUSCH.

SUMMARY

In various exemplary embodiments, methods and apparatus are provided for control channel detection in an uplink shared channel. For example, the methods and apparatus operate efficiently to detect with high probability, control bit information transmitted from user equipment over a PUSCH.

In an exemplary embodiment, a method is provided that includes generating soft-combined bit streams for an acknowledgement (ACK) indicator, rank indicator (RI), and channel quality indicator (CQI) received in an uplink shared channel. The method also includes decoding the ACK, RI, and CQI soft-combined bit streams to generate Top-M decoded bit streams for each indicator, and generating Top-Q symbols for each indicator from the Top-M decoded bit streams for each indicator. The method also includes calculating metrics from the Top-Q symbols and uplink control information (UCI) symbols extracted from the uplink shared channel, combining the metrics to form a search space, and searching the search space to determine transmitted ACK, RI, and CQI bits.

In an exemplary embodiment, an apparatus is provided that includes a demodulator that generates soft-combined bit streams for an acknowledgement (ACK) indicator, rank indicator (RI), and channel quality indicator (CQI) received in an uplink shared channel. The apparatus also includes a decoder that decodes the ACK, RI, and CQI soft-combined bit streams to generate Top-M decoded bit streams for each indicator and a symbol generator that generates Top-Q symbols for each indicator from the Top-M decoded bit streams for each indicator. The apparatus also includes a metric calculator that calculates metrics from the Top-Q symbols and uplink control information (UCI) symbols extracted from the uplink shared channel, a combiner that combines the metrics to form a search space, and a joint detector that searches the search space to determine transmitted ACK, RI, and CQI bits.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
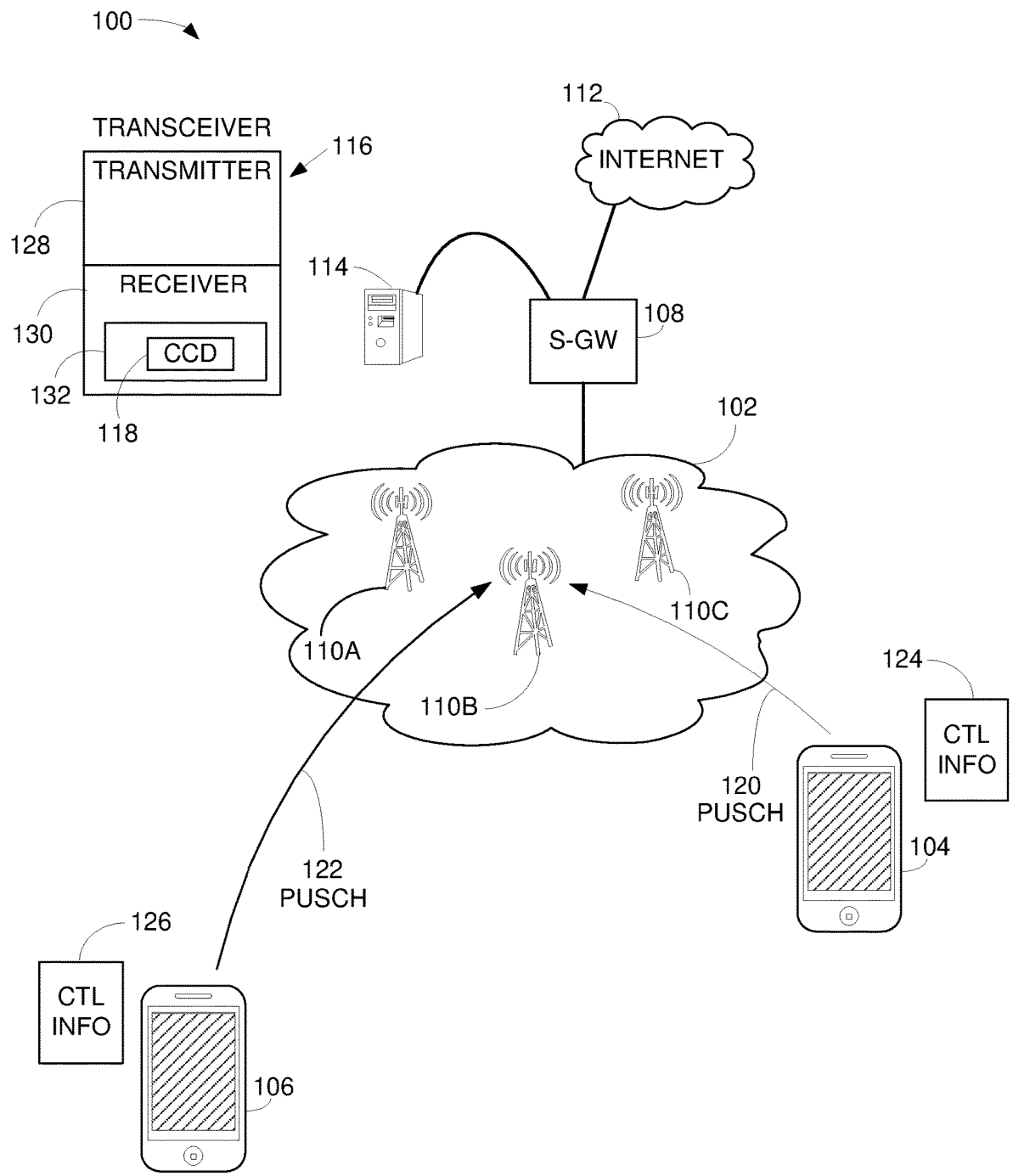
FIG. 1 shows a communication network comprising a transceiver having an exemplary embodiment of a control channel detector (CCD) that efficiently receives and detects control bit information transmitted from user equipment over a physical uplink shared control channel.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and/or other constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows a communication network 100 comprising a transceiver 116 having an exemplary embodiment of a control channel detector (CCD) 118 that efficiently receives and detects control bit information transmitted from user equipment over a physical uplink shared control channel. The network 100 may be configured as a third generation, fourth generation, long term evolution (LTE), or combination of 3G and 4G cellular network.

The communication network 100 includes a server 114 that includes the transceiver 116. The transceiver 116 has a transmitter portion 128 and a receiver portion 130. The server 114 communicates with a serving gateway (S-GW) 108 that further communicates with cell site 102 and the Internet 112. The cell site 102 includes radio towers 110 and associated base stations (not shown).

User equipment (UE) 104 and user equipment 106 are in communication with base station 110B. For example, the UEs 104, 106 can be cellular phones, handheld devices, tablet computers or iPad® devices. It should be noted that the underlying concepts of the exemplary embodiments of the present invention would not change if one or more blocks (or devices) were added or removed from the communication network 100.

In an exemplary embodiment, the UE 104 transmits control bit information 124 to the server 114 using PUSCH 120 and the UE 106 transmits control bit information 126 to the server 114 using PUSCH 122. In an exemplary embodiment, the control bit information includes CQI bits, RI bits, and HARQ-ACK bits.

The receiver portion 130 includes receiver processing hardware (RPH) 132. In an exemplary embodiment, the RPH 132 includes the CCD 118, which is used to perform efficient detection of the control information received over PUSCH from the user equipment. In various exemplary embodiments, the CCD 118 is able to detect the control bit information from received subframes with higher probability than conventional systems to enhance the overall efficiency of the receiver and the operation of the communication network 100.

When control data are transmitted in the PUSCH, the control information bits ACK, RI, CQI are encoded independently using different type of encoding mechanisms depending on the number of information bits. Different coding rates for the control information are achieved by allocating a different number of coded symbols for its transmission. Specifically, when the number of ACK, RI or CQI bits is within the range as shown in Table 1, they are encoded with a Reed-Muller (32, O) code and multiplexed with the turbo encoded data stream to form the PUSCH signals.

TABLE 1

| Control Info | Number of Info Bits | Encoder | Encoded bits |
|---|---|---|---|
| CQI | $O^{CQI} \leq 11$ | RM(32,O) | $b_0^{CQI} b_1^{CQI}, \ldots, b_{31}^{CQI}$ |
| ACK | $O^{ACK} \in [3,11]$ | RM (32,O) | $b_0^{ACK} b_1^{ACK}, \ldots, b_{31}^{ACK}$ |
| RI | $O^{RI} \in [3,11]$ | RM (32,O) | $b_0^{RI} b_1^{RI}, \ldots, b_{31}^{RI}$ |

In an exemplary embodiment, the transmitted ACK, RI and CQI information bits are denoted as $o^{ACK}=[o_0^{ACK} o_1^{ACK}, \ldots, o_{O^{ACK}-1}^{ACK}]$, $o^{RI}=[o_0^{RI} o_1^{RI}, \ldots, o_{O^{RI}-1}^{RI}]$, and $o^{CQI}=[o_0^{CQI} o_1^{CQI}, \ldots, o_{O^{CQI}-1}^{CQI}]$, respectively, where $O^{ACK}, O^{RI}, O^{CQI}$ are the number of information bits that falls into the range of Table 1, respectively. The control information bits are first coded using (32, O) block code, where the code words of the (32, O) block code are a linear combination of 11 basis sequences denoted $M_{i,n}$. The encoded ACK/RI/CQI blocks are denoted by $[b_0^{ACK/RI/CQI}, b_1^{ACK/RI/CQI}, b_2^{ACK/RI/CQI}, b_3^{ACK/RI/CQI}, \ldots, b_{31}^{ACK/RI/CQI}]$, where $$b_i^{ACK/RI/CQI} = \sum_{n=0}^{O^{ACK/RI/CQI}-1} (o_n^{ACK/RI/CQI} \cdot M_{i,n}) \mod 2$$

where i=0, 1, 2, ..., 31. The output bit sequence will be circularly repeated to fit the number of resource elements and multiplexed with the turbo coded data stream for transmission.

Figure 2:
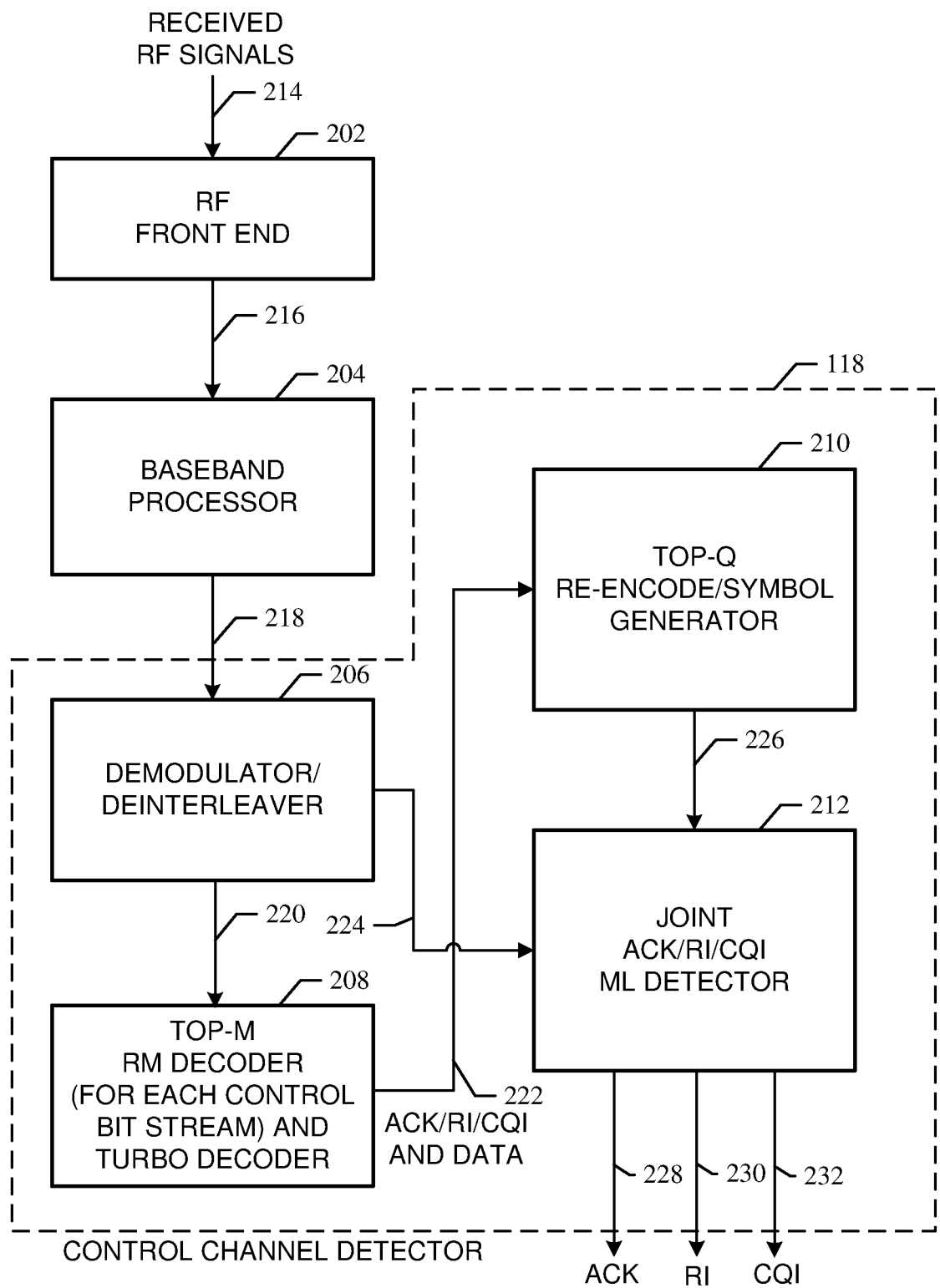
FIG. 2 shows an exemplary embodiment of the control channel detector shown in FIG. 1.

FIG. 2 shows an exemplary embodiment of the control channel detector 118 shown in FIG. 1. For example, the control channel detector 118 operates to receive control bit information contained in a received PUSCH and to determine the transmitted ACK, RI, and CQI bits.

In an exemplary embodiment, the control channel detector 118 uses a two-stage processing architecture for processing the PUSCH to determine the UCI. The first stage includes a preliminary Top-M survival information bit decoder 208 for each control bit stream. The second stage includes a joint ACK/CQI/RI detector 212 that uses a maximum-likelihood based metric search for survival candidates.

During operation, received RF signals 214 are received at an RF front end 202. The received RF signals 214 comprise control bit information transmitted in a PUSCH. The front end passes the received RF signals 216 to a baseband processor 204. For example, the baseband processor 204 is part of the receiver 130 shown in FIG. 1. The baseband processor 204 processes the received RF signals 214 to generate baseband signals 218.

A demodulator/deinterleaver 206 receives the baseband signals 218 output from the baseband processor 204. The demodulator/deinterleaver 206 operates to demodulate and deinterleave the baseband signals 218 to generate UCI and data soft bits 220 that are output to a Top-M decoder 208. The demodulator/deinterleaver 206 also outputs equalized time domain symbols 224 to the joint detector 212.

A Top-M decoder 208 generates the Top-M candidates for each control bit stream, where M is a selectable integer value. Thus, the Top-M decoder 208 generates the Top-M candidates for the ACK, RI, and CQI bits. The Top-M candidates for the ACK/RI/CQI bits 222 including data bits are output to a Top-Q re-encode/symbol generator 210.

The Top-Q re-encode/symbol generator 210 receives the Top-M survival bit sequence candidates and independently re-encodes them using RM (32, O) encoders or using a LUT-based mechanism to generate coded-bits for each candidate information bit sequence. The coded-bits are used to generate symbols 226 for each of the Top-Q candidates which are then output to the joint detector 212.

The joint detector 212 generates a search space for all possible candidate symbols, which is searched to determine the most likely ACK 228, RI 230, and CQI 232 bits.

Thus, the CCD 118 operates to generate a plurality of ACK/RI/CQI candidates and converts these candidates into symbols. The symbols are combined into a search space that is searched to determine the final ACK/RI/CQI bits. A detailed description of the CCD 118 is provided below.

Figure 3:
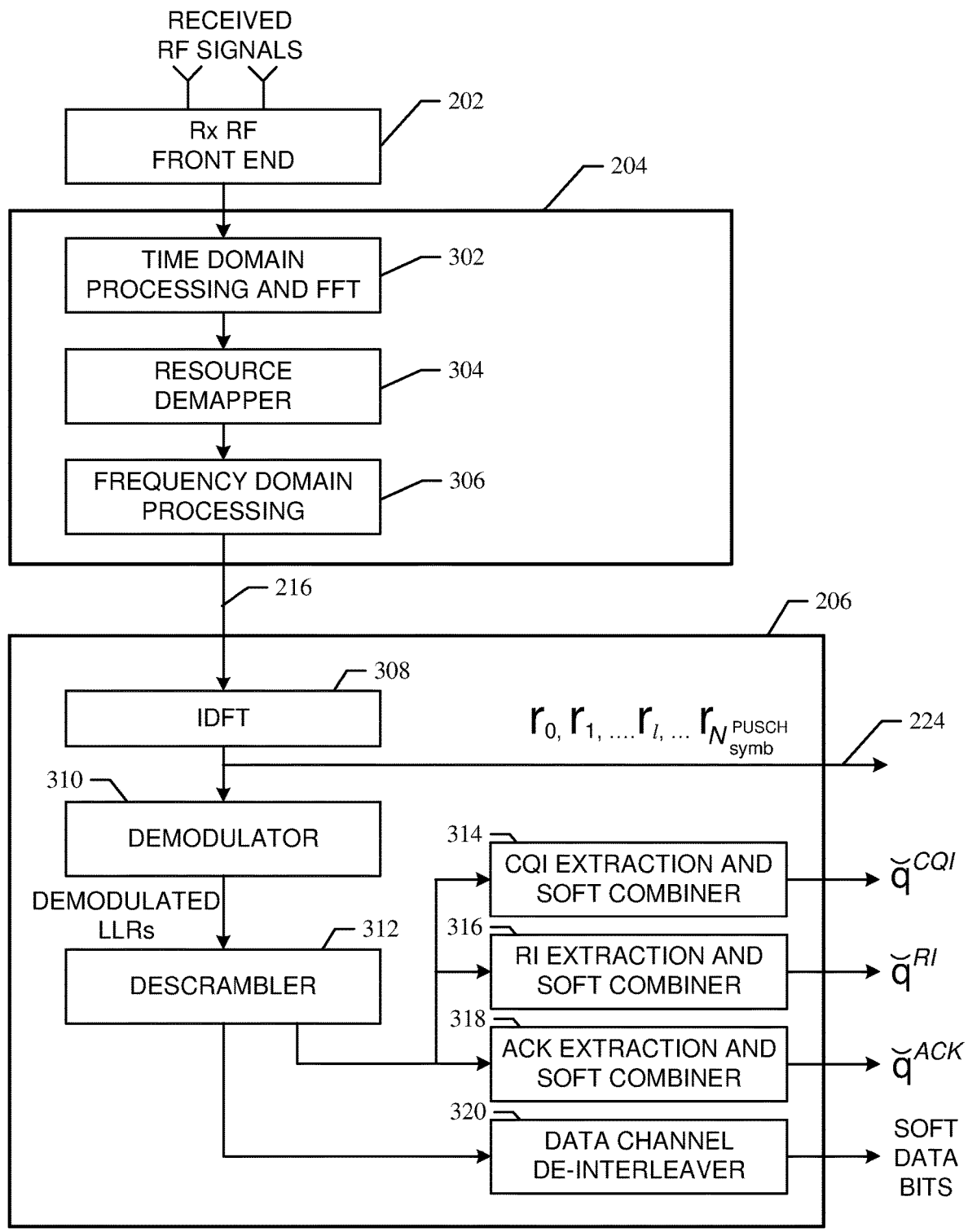
FIG. 3 shows exemplary embodiments of the baseband processor and the demodulator/deinterleaver shown in FIG. 2.

FIG. 3 shows exemplary embodiments of the baseband processor 204 and the demodulator/deinterleaver 206 shown in FIG. 2. In an exemplary embodiment, the baseband processor 204 comprises time domain and FFT processors 302, resource demapper 304, and frequency domain processor 306. The signals 216 output from the baseband processor 204 are output to the demodulator/deinterleaver 206.

The demodulator/deinterleaver 206 comprises inverse DFT block (IDFT) 308, demodulator 310, descrambler 312, soft combiners 314, 316, 318, and de-interleaver 320. In an exemplary embodiment, the receiver chain design up to the point of UCI extraction and soft-combining as well as the turbo decoder for data portion can be the same as in a conventional receiver. In an exemplary embodiment, the equalized time-domain symbols 224 output from the IDFT 308 in a subframe are denoted as $[r_0, r_1, \ldots, r_{N_{symb}^{PUSCH}}]$, where $N_{symb}^{PUSCH}$ is the number of OFDM symbols in a subframe. Assuming l is the symbol index within a subframe (including the DMRS symbols where l={3,10} although it may not be required that these two symbols to be processed by the IDFT 308). The demodulated LLRs output from the demodulator 310 for either QPSK/16-QAM/64-QAM are denoted as follows.

$$\underline{\mathfrak{z}} = \begin{bmatrix} \underline{\mathfrak{z}}_0 & \underline{\mathfrak{z}}_1 & \underline{\mathfrak{z}}_2 & \cdots & \underline{\mathfrak{z}}_{C_{max}-1} \\ \underline{\mathfrak{z}}_{C_{max}} & \underline{\mathfrak{z}}_{C_{max}+1} & \underline{\mathfrak{z}}_{C_{max}+2} & \cdots & \underline{\mathfrak{z}}_{2C_{max}-1} \\ \vdots & \vdots & \vdots & \ddots & \vdots \\ \underline{\mathfrak{z}}_{(R'_{max}-1)\times C_{max}} & \underline{\mathfrak{z}}_{(R'_{max}-1)\times C_{max}+1} & \underline{\mathfrak{z}}_{(R'_{max}-1)\times C_{max}+2} & \cdots & \underline{\mathfrak{z}}_{(R'_{max}\times C_{max}-1)} \end{bmatrix}$$

Each resource element of the above matrix is a vector of $(N_L * Q_m)$ that carries the $N_L$ layers of the $Q_m$ LLR values for an individual resource element, where $N_L$ is the number of layers, and the $Q_m$ is the modulation order that takes value from {2, 4, 6} for {QPSK, 16-QAM, 64-QAM}, respectively.

Figure 4:
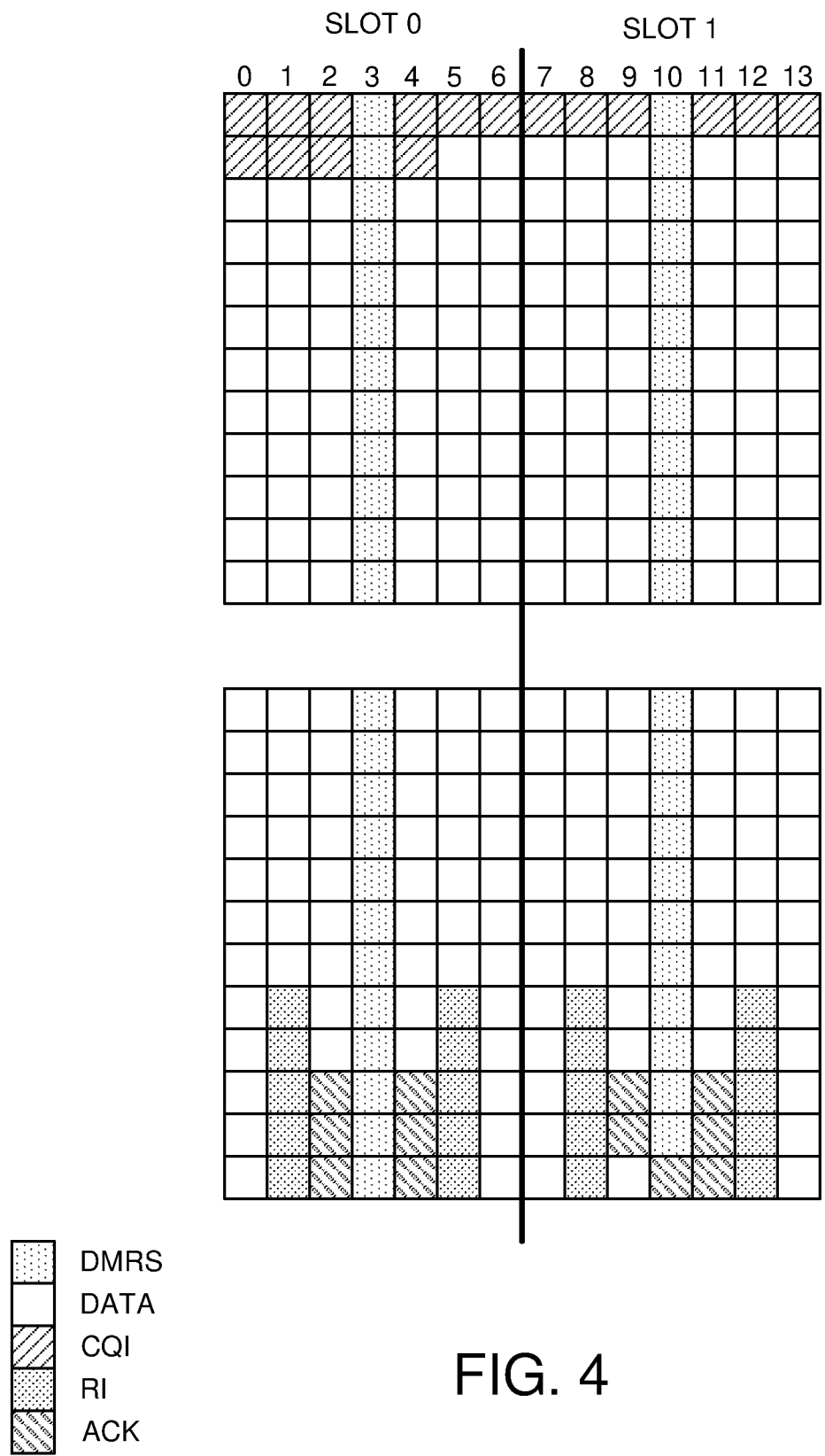
FIG. 4 shows an exemplary embodiment of a resource grid.

Thus, from the system parameters $\{Q_{ACK}', Q_{RI}', Q_{CQI}'\}$ and the channel interleaver procedure, the UCI soft-bits can be readily extracted from the resource grid shown in FIG. 4. In the resource grid, the locations of the different encoded-bits are marked with a shading code as shown in FIG. 4.

Referring again to FIG. 3, the extracted and soft-combined soft-bits after the CQI extraction and soft combining performed by combiner 314 are denoted as $\check{q}^{CQI} = [\check{q}_0^{CQI} \check{q}_1^{CQI}, \ldots, \check{q}_{31}^{CQI}]$, the soft-bits after ACK extraction and soft-combining performed by the combiner 318 are denoted as $\check{q}^{ACK} = [\check{q}_0^{ACK} \check{q}_1^{ACK}, \ldots, \check{q}_{31}^{ACK}]$ and the extracted and soft-combined RI soft-bits after soft-combining by the combiner 316 are denoted as $\check{q}^{RI} = [\check{q}_0^{RI} \check{q}_1^{RI}, \ldots, \check{q}_{31}^{RI}]$. The data channel de-interleaver 320 operates to de-interleave the data portion of the resource grid to generate soft data bits.

Figure 5:
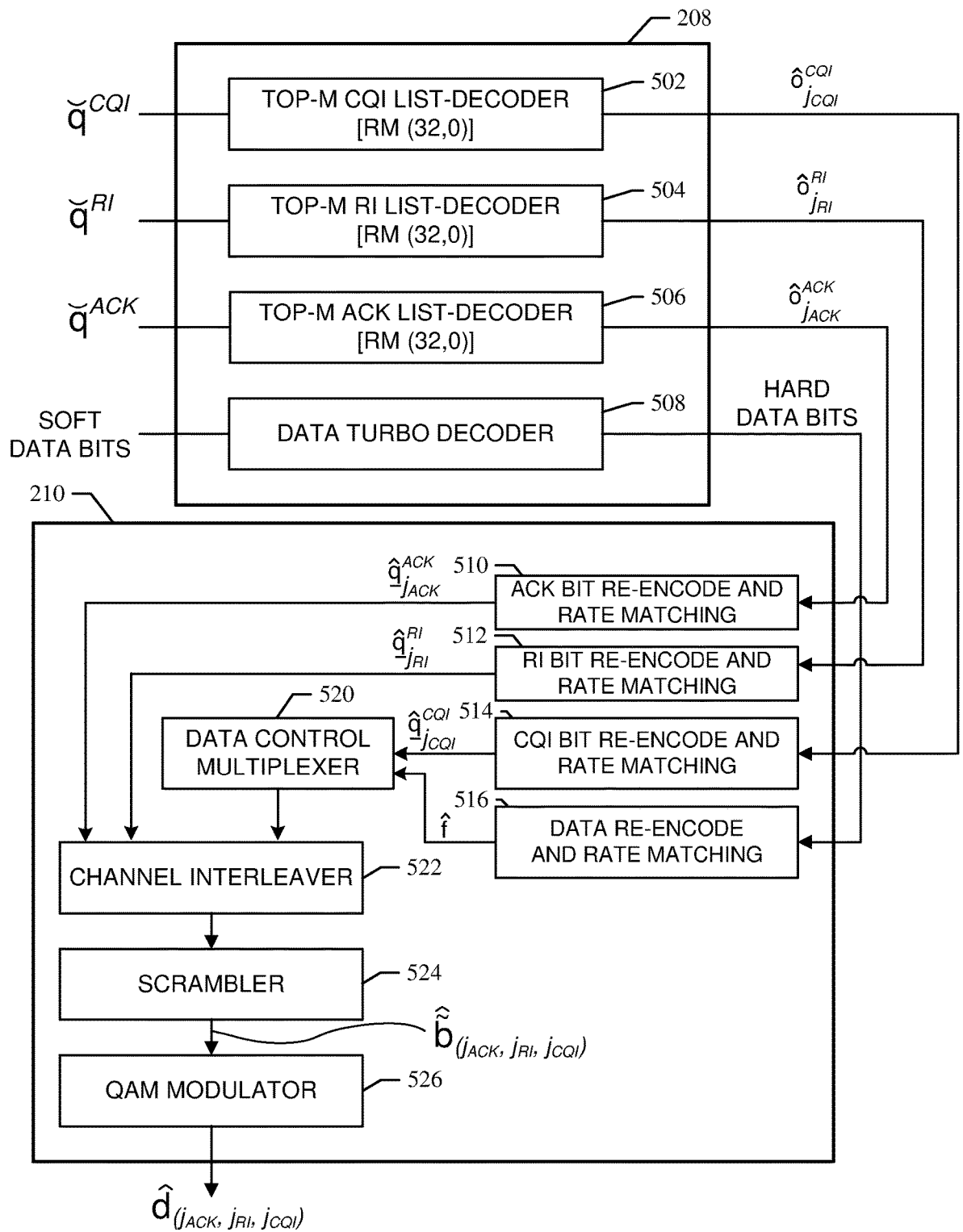
FIG. 5 shows exemplary embodiments of the Top-M decoder and the Top-Q symbol generator shown in FIG. 2.

FIG. 5 shows exemplary embodiments of the Top-M decoder 208 and the Top-Q symbol generator 210 shown in FIG. 2. In an exemplary embodiment, the Top-M decoder 208 comprises a Top-M CQI list decoder 502, a Top-M RI list decoder 504, a Top-M ACK list decoder 506, and a data turbo decoder 508.

As the decoding performance of both the control information and the data directly impacts the overall system throughput, better performance detection is always desired. In conventional systems, a standalone RM decoder works by itself to decode the ACK, RI and CQI bit streams separately with a sole decoded bit sequence. However, in various exemplary embodiments, the Top-M decoder 208 utilizes a separate RM decoder for each stream thereby improving decoding efficiency.

The Top-M CQI list decoder 502 generates the Top-M candidates (where M is a selectable integer) of the CQI bits by using the $\check{q}^{CQI}$ as an input to a RM (32,O) decoder that generates not only the decoded hard-bits CQI, but also the Top-M candidates $\hat{o}_{j_{CQI}}^{CQI} = [\hat{o}_0^{CQI}, \hat{o}_1^{CQI}, \hat{o}_2^{CQI}, \hat{o}_3^{CQI}, \ldots, \hat{o}_{o^{CQI}-1}^{CQI}]_{j_{CQI}}$ that have the highest correlation result from the RM decoder. Similarly, the Top-M RI list decoder 504 and the Top-M ACK list decoder 506 process the $\check{q}^{RI}$ and $\check{q}^{ACK}$ bit streams independently to generate the Top-M candidates for both RI and ACK bits, namely, $\hat{o}_{j_{RI}}^{RI} = [\hat{o}_0^{RI} \hat{o}_1^{RI}, \ldots, \hat{o}_{o^{RI}-1}^{RI}]_{j_{RI}}$ and $\hat{o}_{j_{ACK}}^{ACK} = [\hat{o}_0^{ACK} \hat{o}_1^{ACK}, \ldots, \hat{o}_{o^{ACK}-1}^{ACK}]_{j_{ACK}}$, respectively, where $\{j_{CQI}, j_{ACK}, j_{RI}\} \in [0, M-1]$. In another example, $\{j_{CQI}, j_{ACK}, j_{RI}\}$ can take different M values if necessary.

In an exemplary embodiment, the M survival bit sequence candidates will be re-encoded using a RM (32,O) encoder or using a LUT-based mechanism to generate the coded-bits for each candidate information bit sequence and then circularly repeated (for rate matching) as performed during the transmission of the UCI bits to make M parallel bit-sequences output from bit re-encode and rate matching circuits 510, 512, 514 as $\hat{q}_{j_{CQI}}^{CQI} = [\hat{q}_0^{CQI} \hat{q}_1^{CQI}, \ldots, \hat{q}_{N_L \cdot Q_{CQ}-1}^{CQI}]_{j_{CQI}}$, $\hat{q}_{j_{ACK}}^{ACK} = [\hat{q}_0^{ACK} \hat{q}_1^{ACK}, \ldots, \hat{q}_{Q_{ACK}-1}^{ACK}]_{j_{ACK}}$ and $\hat{q}_{j_{RI}}^{RI} = [\hat{q}_0^{RI} \hat{q}_1^{RI}, \ldots, \hat{q}_{Q_{RI}-1}^{RI}]_{j_{RI}}$, where each sub-vector within the vector is of the size of $(N_L * Q_m)$.

The Top-M possible CQI/ACK/RI candidates will be merged to produce $M^3$ possible candidate sequences. The re-encoded data bits $\hat{f}$ after the turbo encoder and rate-matching circuit 516 are multiplexed with the M-branches of CQI bits $\hat{q}_{j_{CQI}}^{CQI}$ by multiplexer 520 and then passed to the channel interleaver 522. The interleaved bits will be scrambled by the scrambler 524 using the same scrambler code used in the received transmission to produce $\hat{b}_{(j_{ACK},j_{RI},j_{CQI})} = [\hat{b}^{(q)}(0), \ldots, \hat{b}^{(q)}(M_{bit}^{(q)}-1)]_{(j_{ACK},j_{RI},j_{CQI})}$ re-generated scrambled bits for all the candidates. These scrambled bits will be passed to the QAM modulator 526 to produce the all the candidate (Top-Q) data symbols $\hat{d}_{(j_{ACK},j_{RI},j_{CQI})} = [\hat{d}^{(q)}(0), \ldots, \hat{d}^{(q)}(M_{symb}^{(q)}-1)]_{(j_{ACK},j_{RI},j_{CQI})}$ for the M-candidates of ACK/CQI/RI bits. The $\hat{b}_{(j_{ACK},j_{RI},j_{CQI})}$ bits can also be written in the format as follows to match the OFDM time-frequency resource grid, where each column vector represents a single OFDM symbol.

$$\underline{z} = \begin{bmatrix} z_{(0,0)} & z_{(0,1)} & \cdots & z_{(0,N_{sym}^{PUSCH}-1)} \\ z_{(1,0)} & z_{(1,1)} & \cdots & z_{(1,N_{sym}^{PUSCH}-1)} \\ \vdots & \vdots & \ddots & \vdots \\ z_{(N_{SC}^{PUSCH}-1,0)} & z_{(N_{SC}^{PUSCH}-1,1)} & \cdots & z_{(N_{SC}^{PUSCH}-1,N_{sym}^{PUSCH}-1)} \end{bmatrix}$$

In an exemplary embodiment, the candidate symbols $\hat{d}_{(j_{ACK},j_{RI},j_{CQI})}$ can be formed into a time-frequency resource grid to match the resource allocation shown in FIG. 4.

Figure 6:
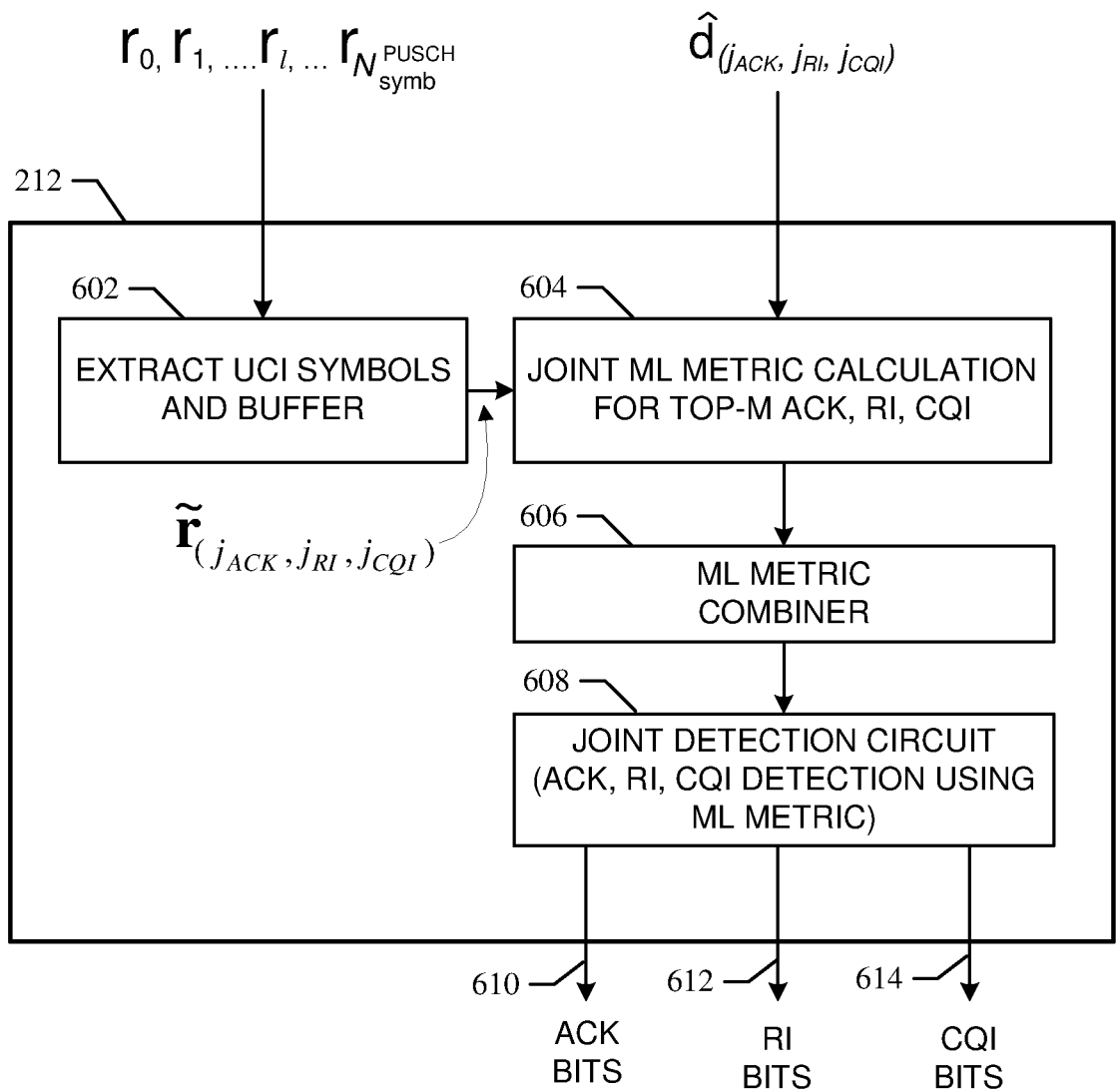
FIG. 6 shows an exemplary embodiment of the joint detector shown in FIG. 2.

FIG. 6 shows an exemplary embodiment of the joint detector 212 shown in FIG. 2. In an exemplary embodiment, the joint detector 212 comprises symbol extractor 602, joint metric calculator 604, metric combiner 606, and joint detection circuit 608.

In an exemplary embodiment, symbol extractor 602 receives the symbols output from the IDFT 308 and extracts only the UCI symbols and buffers them to feed to the joint maximum-likelihood based metric calculator 604 that receives the corresponding $\hat{d}_{(j_{ACK},j_{RI},j_{CQI})}$, resource elements. In an exemplary embodiment, the symbol extractor 602 extracts a subset of equalized symbols denoted as $\tilde{r}_{(j_{ACK},j_{RI},j_{CQI})}$ that are a subset of the time domain symbols $[r_0, r_1, \ldots, r_l, \ldots, r_{N_{symb}^{PUSCH}}]$. The operation of the extractor 602 to extract the subset of equalized symbol can be expressed as the following.

$$\tilde{r}_{(j_{ACK},j_{RI},j_{CQI})} = \text{UCIExtract}([r_0, r_1, \ldots, r_l, \ldots, r_{N_{symb}^{PUSCH}}])$$

In an exemplary embodiment, the joint metric calculator 604 computes a maximum-likelihood based metric jointly for the Top-M ACK, RI and CQI regenerated symbols. In an exemplary embodiment, the ML metric is a function of the extracted time domain equalized symbols output from the IDFT 308 and expressed as follows.

$$\text{Metric}_{j_{ACK},j_{RI},j_{CQI}}^{l,r} = f(\hat{d}_{j_{ACK},j_{RI},j_{CQI}}, \tilde{r}_{ACK}^{l,r}, \tilde{r}_{CQI}^{l,r}, \tilde{r}_{RI}^{l,r})$$

In an exemplary embodiment, the metric should possess good correlation characteristics to differentiate the candidates. Specifically, a desired metric will give a peak value for the right candidate $(j_{ACK}, j_{RI}, j_{CQI})$ that is transmitted but gives very small values for those wrong combination of candidates. As shown above, the indices (l, r) denote the OFDM symbol index and the receive antenna index, respectively.

In an exemplary embodiment, the ML-metric combiner 606 is applied to achieve a diversity gain across multiple antennas and multiple symbols as follows.

$$\text{Metric}_{j_{ACK},j_{RI},j_{CQI}}^{ALL} = \sum_r \sum_l \text{Metric}_{j_{ACK},j_{RI},j_{CQI}}^{l,r}$$

The above only gives an example of one type of metric combining. In another embodiment, the combining can follow a different order where the metric itself is performed in multiple steps as follows.

$$\text{Metric}_{j_{ACK},j_{RI},j_{CQI}}^{r,partial} = g(\hat{d}_{j_{ACK},j_{RI},j_{CQI}}, \tilde{r}_{ACK}^{l,r}, \tilde{r}_{CQI}^{l,r}, \tilde{r}_{RI}^{l,r})$$

$$\text{Metric}_{j_{ACK},j_{RI},j_{CQI}}^{ALL} = \sum_r \text{Metric}_{j_{ACK},j_{RI},j_{CQI}}^{r,partial}$$

In an exemplary embodiment, the joint ACK/CQI/RI detector 608 searches all the possible space of combined Top-M ACK, CQI and RI bit candidates to determine the final bit sequences for ACK 610, RI 612, and CQI 614. Specifically, the final detected joint bit sequences for ACK, CQI and RI bits are determined by the following.

$$[\hat{o}^{ACK}, \hat{o}^{CQI}, \hat{o}^{RI}] = \underset{j_{ACK},j_{RI},j_{CQI}}{\text{argmax}} \left( \text{Metric}_{j_{ACK},j_{RI},j_{CQI}}^{ALL} \right)$$

Figure 7:
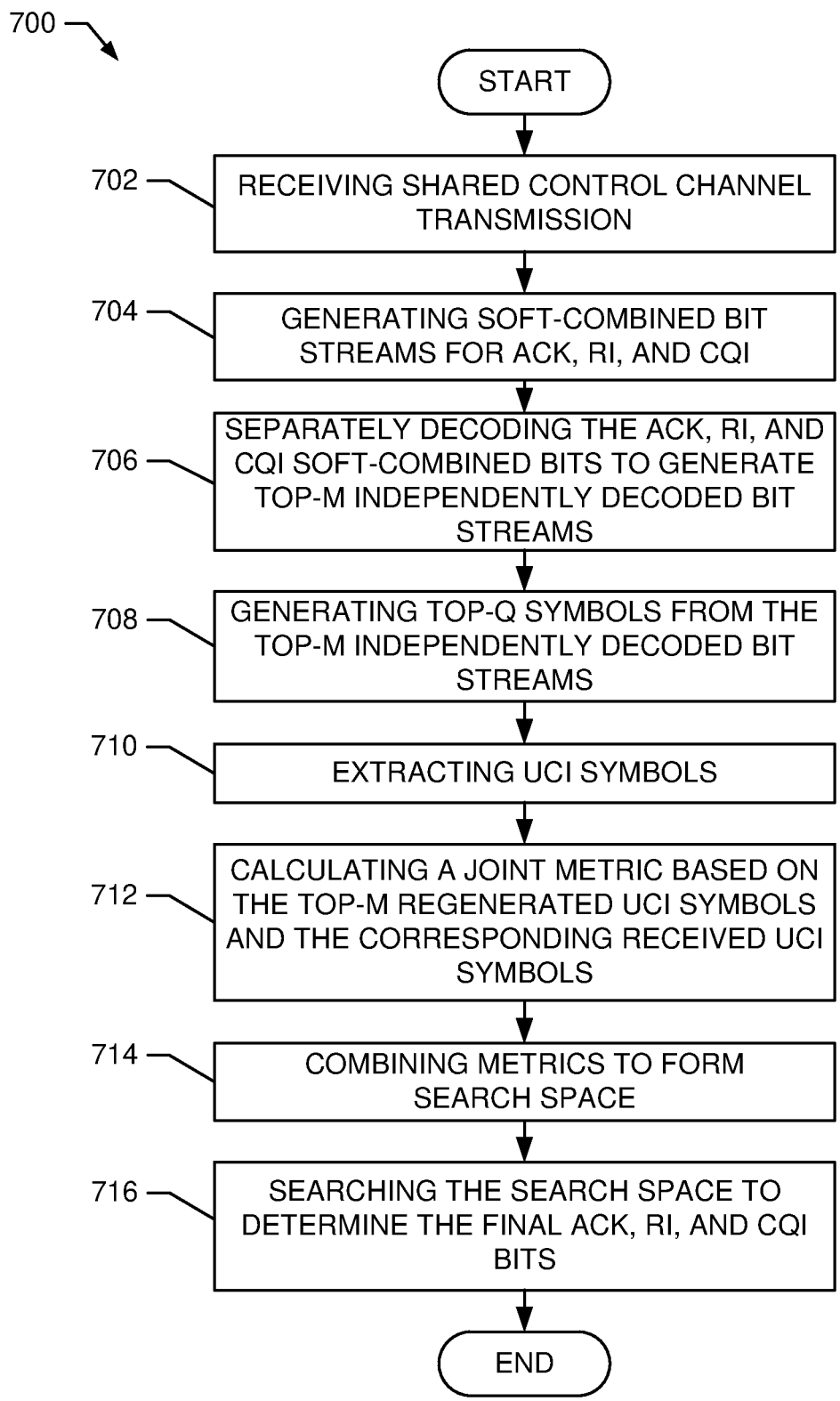
FIG. 7 shows an exemplary method for control channel detection in a physical uplink shared control channel.

FIG. 7 shows an exemplary method 700 for control channel detection in a physical uplink shared control channel. For example, the method 700 is suitable for use with the CCD 118 shown in FIGS. 2-6.

Block 702 comprises an operation of receiving a shared control channel transmission. For example, control channel transmission comprises ACK, RI and CQI bits received in a PUSCH. In an exemplary embodiment, the control channel transmission is received by the RF front end 202 and the received information is passed to the baseband processor 204.

Block 704 comprises an operation of generating soft-combined bits streams for the ACK, RI, and CQI parameters. In an exemplary embodiment, the demodulator/deinterleaver 206 generates these soft-combined bit streams along with soft data bits that are output to the Top-M decoder 208.

Block 706 comprises an operation of separately decoding the ACK, RI, and CQI soft-combined bit streams to generate Top-M independently decoded bit streams. In an exemplary embodiment, the Top-M decoder 208 includes separate RM decoders (502-506) that generates the Top-M candidate bits streams for each of the ACK, RI, and CQI information. The decoder 208 also includes a data turbo decoder that generates hard data bits.

Block 708 comprises an operation of generating Top-Q symbols form the Top-M bit streams. For example, this operation is performed by the Top-Q symbol generator 210. For example, in an exemplary embodiment, the Top-M candidate bits streams are re-encoded and rate matched by circuits (510-514). The rate matched data flows to channel interleaver 522, which outputs interleaved data to the scrambler 524. The scrambled output is them modulated by the modulator 526 to generate the Top-Q symbols. In an exemplary embodiment, the above operations are performed substantially the same as in the transmitted that transmitted the received PUSCH transmission.

Block 710 comprises an operation of extracting UCI symbols is performed. For example, in an exemplary embodiment, this operation is performed by the UCI symbol extractor 602.

Block 712 comprises an operation of calculating a joint metric based on the Top-M symbols and the extracted symbols. For example, this operation is performed by the metric calculator 604.

Block 714 comprises an operation of combining metrics to form a search space. For example, the metrics combiner 606 performs this operation.

Block 716 comprises an operation of searching the combined metric space to determine the final ACK, RI, and CQI bits. For example, the joint detection circuit 608 performs this operation.

Thus, the method 700 operates to efficiently detect control bits received in a PUSCH transmission. It should be note that the operation of the method 700 are exemplary and may be changed, modified, added to, delete from, and/or rearranged within the scope of the embodiments.

The exemplary aspect of the present invention includes various processing steps as described above. The steps may be embodied in machine or computer executable instructions. The instructions can be used to cause special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those skilled in the art that, based upon the teachings herein, changes and modifications may be made without departing from these exemplary embodiments and their broader aspects. Therefore, the appended claims are intended to encompass within their scope all such changes and modifications as are within the true spirit and scope of these exemplary embodiments of the present invention.

What is claimed is:

1. A method for facilitating a wireless network communication, comprising:
    forwarding a first copy of the descrambled bit stream to a first control signal extraction and soft combiner for extracting soft bits relating to channel quality indicator ("CQI") signals from a time-frequency resource grid and combining the soft bits to produce a first soft bit stream representing the CQI signals;
    sending a first decoded bit stream to a control signal encoder to encode the first decoded bit stream for generating a first candidate relating to the first control signal;
    extracting uplink control information ("UCI") symbols from an output stream containing multiple symbols obtained from a demodulator;
    identifying a maximum-likelihood ("ML") metric in accordance with the UCI symbols and resource elements received from a symbol generator;
    applying a gain to the ML metric to perform a metric combining for a search space; and
    searching the search space to identify bit sequences for at least one of acknowledgement ("ACK") bits and channel quality indictor ("CQI") bits.

2. The method of claim 1, further comprising generating a bit streams by a soft combiner for combining an ACK indicator, rank indicator ("RI"), and CQI received in an uplink shared channel.

3. The method of claim 1, further comprising decoding the ACK, rank indicator ("RI"), and CQI from bit streams to generate first decoded bit streams for each indicator.

4. The method of claim 3, wherein the decoding includes independently decoding the ACK, RI, and CQI bit streams with separate Reed Muller (RM) decoders to generate independent first decoded bit streams for each indicator.

5. The method of claim 1, further comprising generating second symbols for each indicator from the first decoded bit streams for each indicator.

6. The method of claim 1, wherein identifying the ML metric includes calculating metrics from the second symbols and UCI symbols extracted from the uplink shared channel.

7. The method of claim 1, further comprising a physical uplink shared control channel ("PUSCH") in a telecommunication system.

8. A method for facilitating network communication, comprising:
    descrambling radio frequency ("RF") signals from an uplink shared channel to generate a descrambled bit stream;
    forwarding a first copy of the descrambled bit stream to a first control signal extraction and soft combiner for extracting soft bits relating to channel quality indicator ("CQI") signals from a time-frequency resource grid and combining the soft bits to produce a first soft bit stream representing the CQI signals;
    forwarding a second copy of the descrambled bit stream to a second control signal extraction and soft combiner for extracting soft bits relating to control information from the time-frequency resource grid and combining the soft bits to produce a second soft bit stream representing a second control signal; and
    sending a first decoded bit stream to a control signal encoder to encode the first decoded bit stream for generating a first candidate relating to the first control signal.

9. The method of claim 8, further comprising sending the first soft bit stream to a first control information decoder to decode the first soft bit stream to generate a first decoded bit stream.

10. The method of claim 8, further comprising sending the second soft bit stream to a second control information decoder to decode the second soft bit stream to generate a second decoded bit stream.

11. The method of claim 8, further comprising sending a second decoded bit stream to a control signal encoder to encode the second decoded bit stream for generating a second candidate relating to the second control signal.

12. The method of claim 8, further comprising generating a plurality of candidate symbols in response to identified candidates.

13. The method of claim 12, wherein generating the plurality of candidate symbols includes identifying channel quality indicator ("CQI") as a first candidate and rank indicator ("RI") as a second candidate.

14. The method of claim 8, wherein forwarding a second copy of the descrambled bit stream includes generating bit streams for an acknowledgement ("ACK") indicator.

15. The method of claim 8, wherein forwarding a second copy of the descrambled bit stream includes generating decoded bit streams for an ACK indicator and generating symbols for the ACK indicator from the decoded bit streams for the ACK indicator.

16. A network device configured to identify channel control information for a communications network, comprising:
 a first extraction and soft combiner configured to extract first soft bits relating to a channel quality indicator ("CQI") from a time-frequency resource grid and combine the first soft bits to produce a first soft bit stream representing the CQI;
 a second extraction and soft combiner coupled to the first extraction and soft combiner and configured to extract second soft bits relating to an acknowledgement ("ACK") from the time-frequency resource grid and combine the second soft bits to produce a second soft bit stream representing the ACK;
 a first decoder coupled to the first extraction and soft combiner and configured to decode the first soft bit stream to generate a decoded CQI bit stream;
 a second decoder coupled to the second extraction and soft combiner and configured to decode the second soft bit stream to generate a decoded ACK bit stream; and
 a Quadrature amplitude modulation ("QAM") modulator coupled to the first, second, and third decoders and configured to generate a plurality of candidate symbols.

17. The network device of claim 16, further comprising a descrambler configured to descramble radio frequency ("RF") signals from an uplink shared channel for generating a descrambled bit stream.

18. The network device of claim 16, further comprising a third extraction and soft combiner coupled to the descrambler and configured to extract third soft bits relating to a rank indicator ("RI") from the time-frequency resource grid and combine the third soft bits to produce a third soft bit stream representing the RI via the descrambled bit stream from the descrambler.

19. The network device of claim 18, further comprising a third decoder coupled to the first extraction and soft combiner and configured to decode the third soft bit stream to generate a decoded RI bit stream.

20. The network device of claim 16, further comprising a joint detector coupled to the QAM modulator and configured to generate a plurality of bit sequences for ACK, CQI, and RI.

21. An apparatus for facilitating a wireless network communication, comprising:
 means for forwarding a first copy of the descrambled bit stream to a first control signal extraction and soft combiner for extracting soft bits relating to channel quality indicator ("CQI") signals from a time-frequency resource grid and combining the soft bits to produce a first soft bit stream representing the CQI signals;
 means for sending a first decoded bit stream to a control signal encoder to encode the first decoded bit stream for generating a first candidate relating to the first control signal;
 means for extracting uplink control information ("UCI") symbols from an output stream containing multiple symbols obtained from a demodulator;
 means for identifying a maximum-likelihood ("ML") metric in accordance with the UCI symbols and resource elements received from a symbol generator;
 means for applying a gain to the ML metric to perform a metric combining for a search space; and
 means for searching the search space to identify bit sequences for at least one of acknowledgement ("ACK") bits, rank indicator ("RI") bits, and channel quality indictor ("CQI") bits.

22. The apparatus of claim 21, further comprising means for generating a bit streams by a soft combiner for combining an ACK indicator, rank indicator ("RI"), and CQI received in an uplink shared channel.

23. The apparatus of claim 21, further comprising means for decoding the ACK, RI, and CQI from streams to generate first decoded bit streams for each indicator.

24. The apparatus of claim 23, wherein the means for decoding includes means for independently decoding the ACK, RI, and CQI bit streams with separate Reed Muller (RM) decoders to generate independent first decoded bit streams for each indicator.

25. The method of claim 21, further comprising means for generating second symbols for each indicator from the first decoded bit streams for each indicator.

26. A method for facilitating network communication, comprising:
 descrambling radio frequency ("RF") signals from an uplink shared channel to generate a descrambled bit stream;
 forwarding a first copy of the descrambled bit stream to a first control signal extraction and soft combiner for extracting soft bits relating to rank indicator ("RI") signals from a time-frequency resource grid and combining the soft bits to produce a first soft bit stream representing the RI signals;
 forwarding a second copy of the descrambled bit stream to a second control signal extraction and soft combiner for extracting soft bits relating to control information from the time-frequency resource grid and combining the soft bits to produce a second soft bit stream representing a second control signal; and
 sending a first decoded bit stream to a control signal encoder to encode the first decoded bit stream for generating a first candidate relating to the first control signal.

27. The method of claim 26, further comprising sending the first soft bit stream to a first control information decoder to decode the first soft bit stream to generate a first decoded bit stream.

28. The method of claim 26, further comprising sending the second soft bit stream to a second control information decoder to decode the second soft bit stream to generate a second decoded bit stream.

* * * * *